United States Patent [19]
Buchholz

[11] Patent Number: 5,797,180
[45] Date of Patent: Aug. 25, 1998

[54] METHOD OF MANUFACTURING A PLASTIC CAMSHAFT WITH A TUBULAR METAL INSERT

[75] Inventor: Brian S. Buchholz, Chilton, Wis.

[73] Assignee: Tecumseh Products Company, Tecumseh, Mich.

[21] Appl. No.: 703,969

[22] Filed: Aug. 28, 1996

[51] Int. Cl.$^6$ ................................................ B23P 15/00
[52] U.S. Cl. ............................................ 29/888.1; 74/567
[58] Field of Search ........................... 29/888.1, 527.1; 74/567, 568; 123/90.6; 264/251

[56] References Cited

U.S. PATENT DOCUMENTS

| 5,195,229 | 3/1993 | Hughes | 29/888.1 |
| 5,245,888 | 9/1993 | Tsuzuki et al. | 29/888.1 |

FOREIGN PATENT DOCUMENTS

| 31 52 899 A1 | 8/1983 | Germany | F28F 9/02 |
| 57-099225 | 6/1982 | Japan . | |
| 57-120761 | 7/1982 | Japan | F16H 53/02 |
| 60-052324 | 3/1985 | Japan . | |
| 63-012809 | 1/1988 | Japan . | |

OTHER PUBLICATIONS

EP 97 11 3946 –European Search Report Dated Dec. 4, 1997.

*Primary Examiner*—Irene Cuda
*Attorney, Agent, or Firm*—Baker & Daniels

[57] ABSTRACT

A method of manufacturing a plastic camshaft having a tubular metal insert using a die assembly having a pair of aligned pins. The tubular metal insert is cut to a length slightly shorter than the length of the finished camshaft and is placed on one of the pins. The second pin is then inserted into the opposite end of the tubular metal insert during the closing of the die assembly. The pins properly align the metal insert within the mold cavity of the die assembly during injection of a surrounding plastic material which forms the remainder of the camshaft. The pins also axially compress the tubular metal insert and have tapered shoulders which bear against and slightly deform or flare the end regions of the insert. The flared ends of the tubular metal insert tightly engage the pins and prevent the formation of flash within the hollow interior of the tubular metal insert. By cutting the inserts to a length which is shorter than the total length of the camshaft, imprecision in the cutting of the insert does not result in the formation of flash adjacent the annular ends of insert. This method permits the tubular metal insert to be properly located within the mold and prevent the formation of flash during injection of molten plastic without requiring the metal insert to be precision ground.

16 Claims, 5 Drawing Sheets

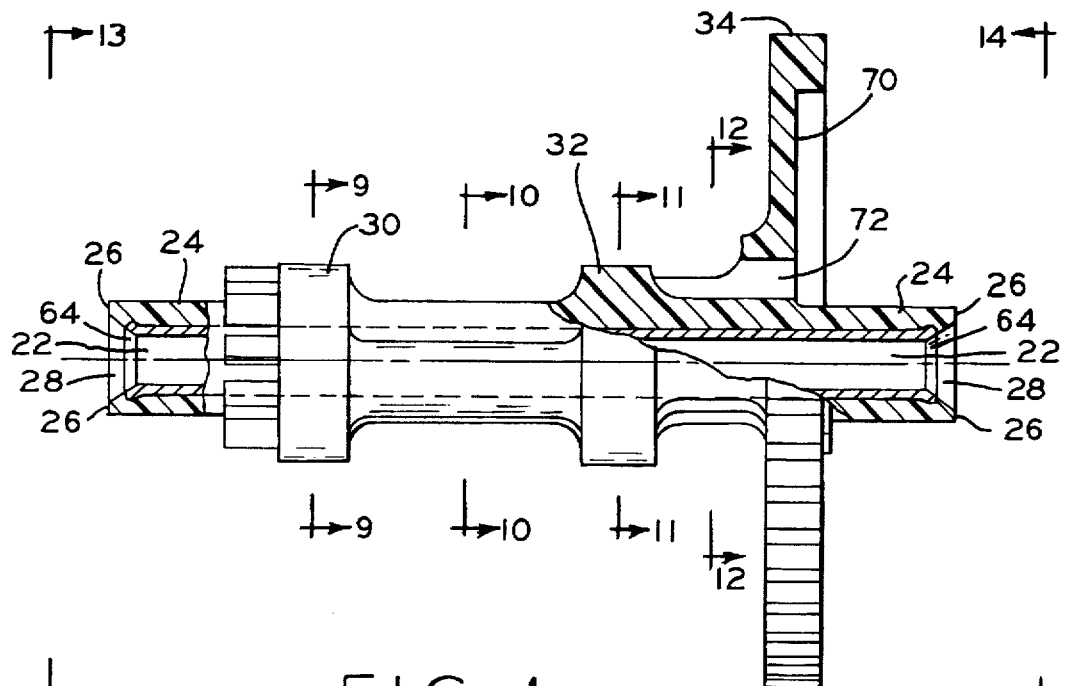
FIG_1
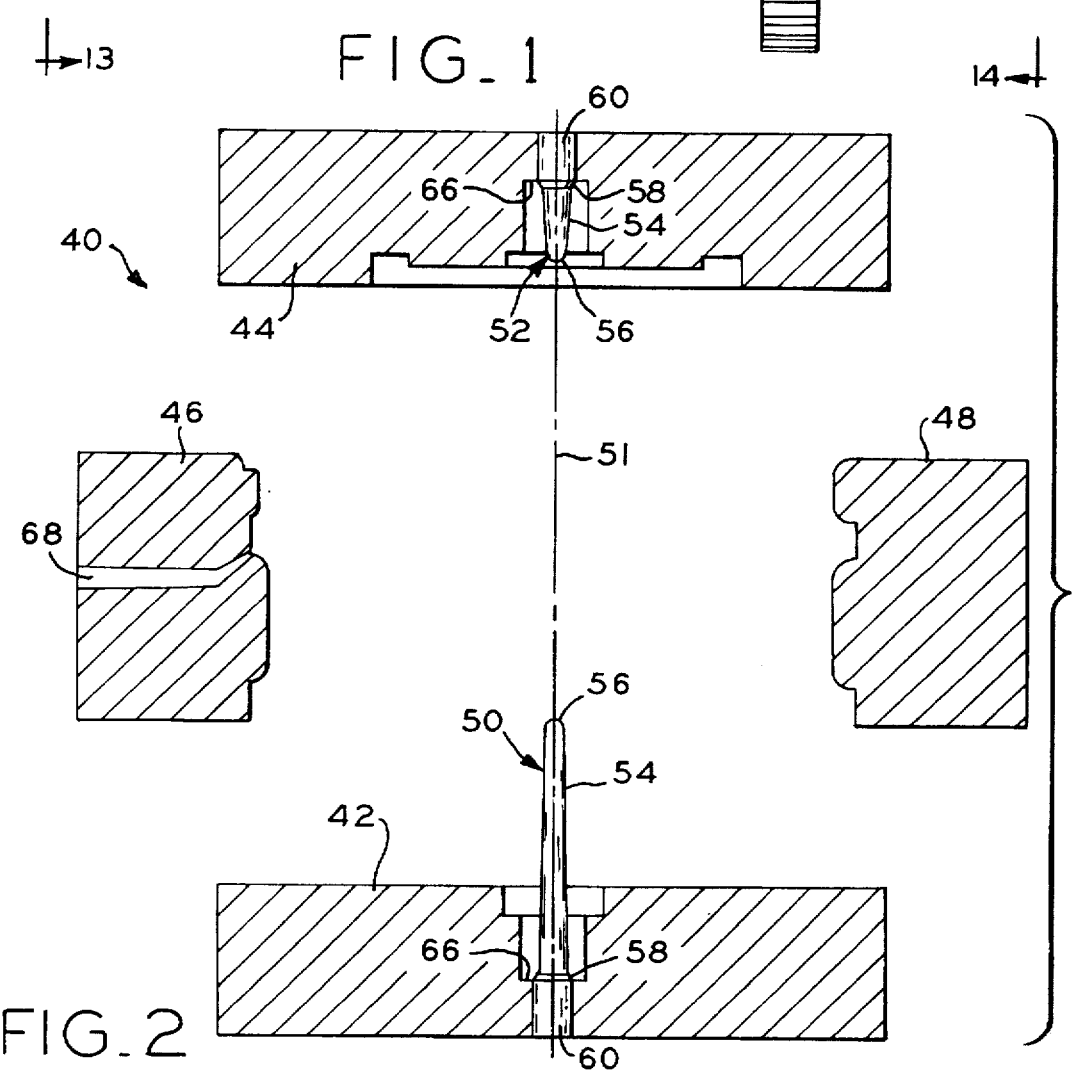
FIG_2

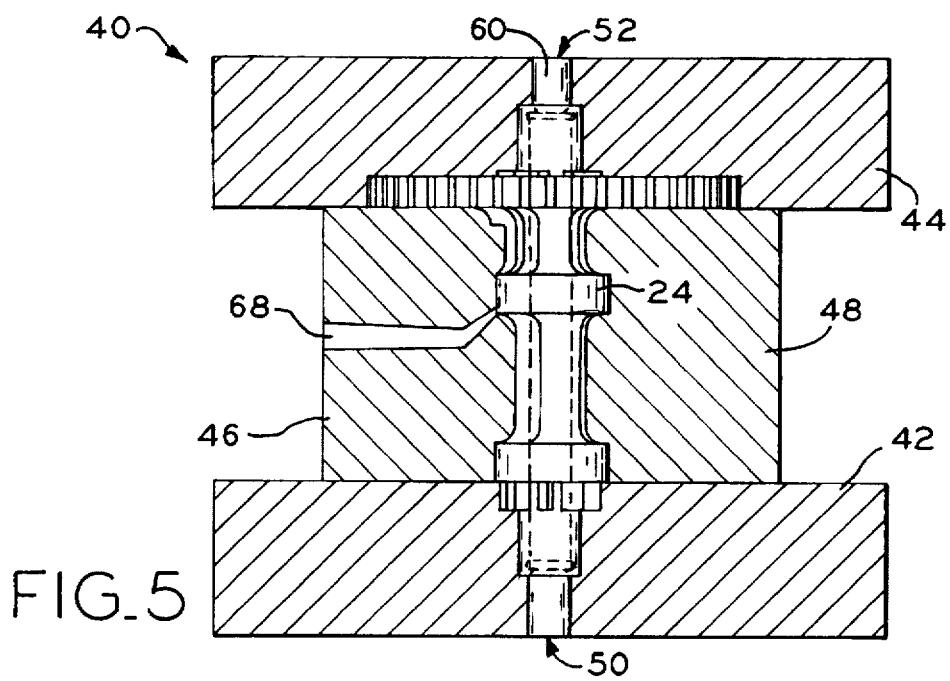
FIG_5
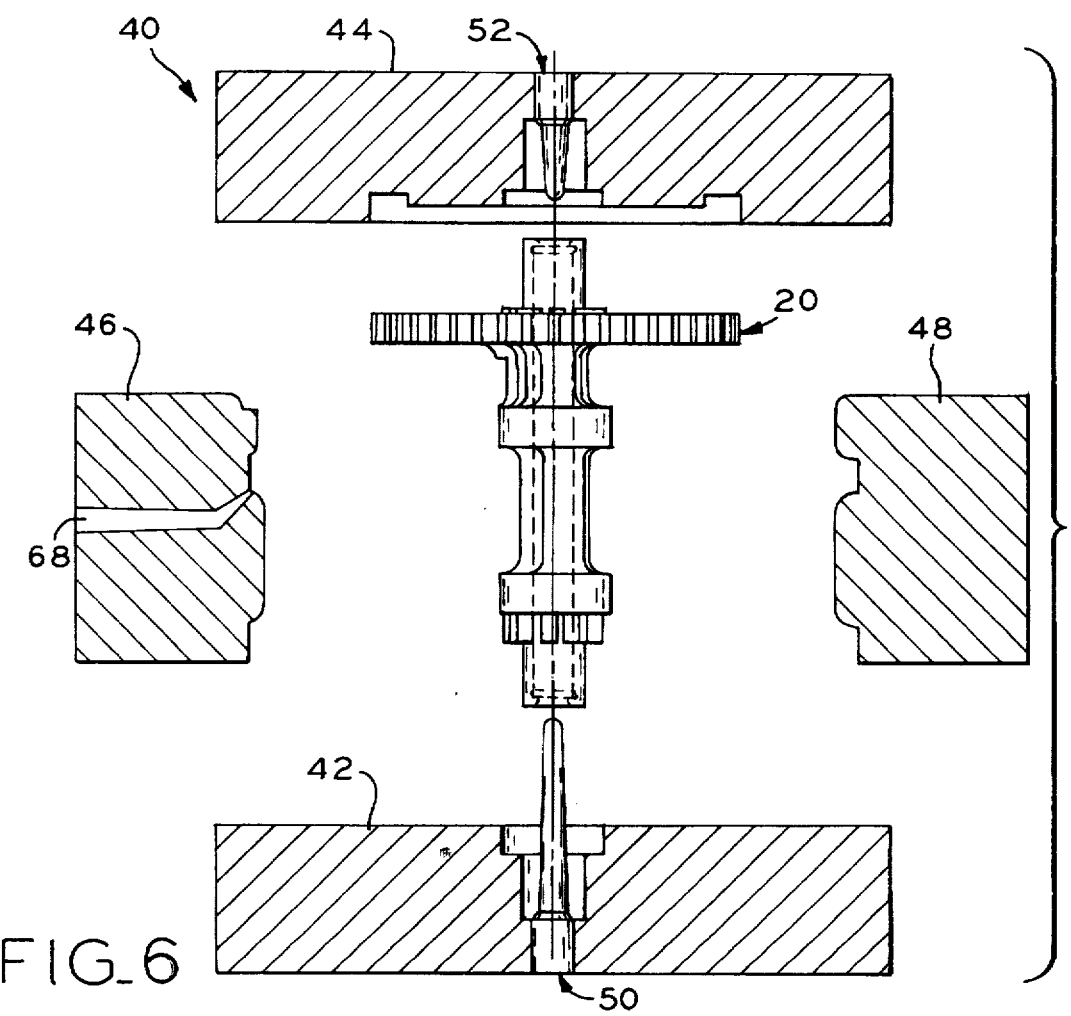
FIG_6

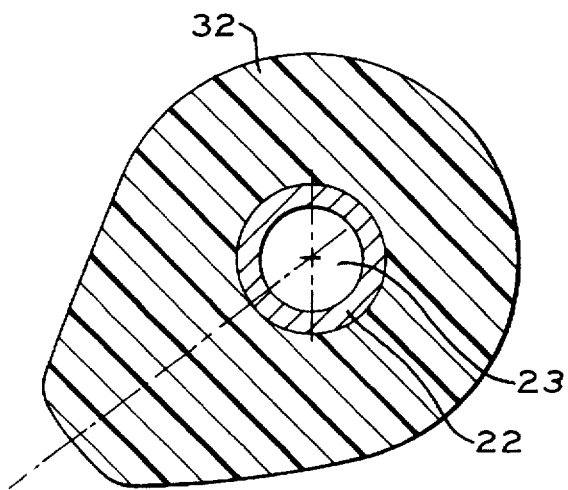
FIG_11
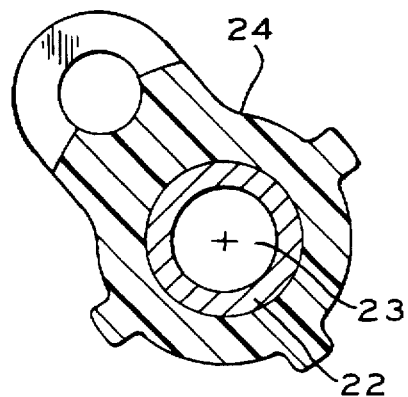
FIG_12
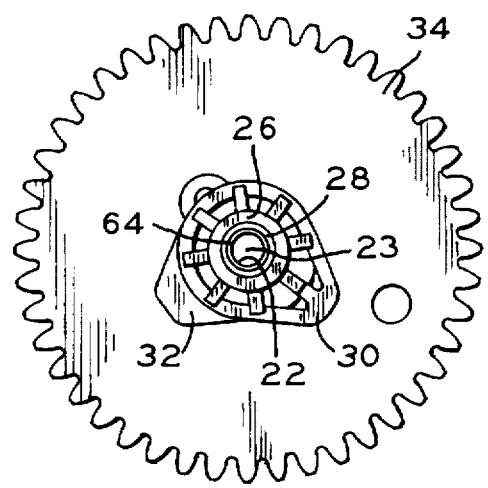
FIG_13
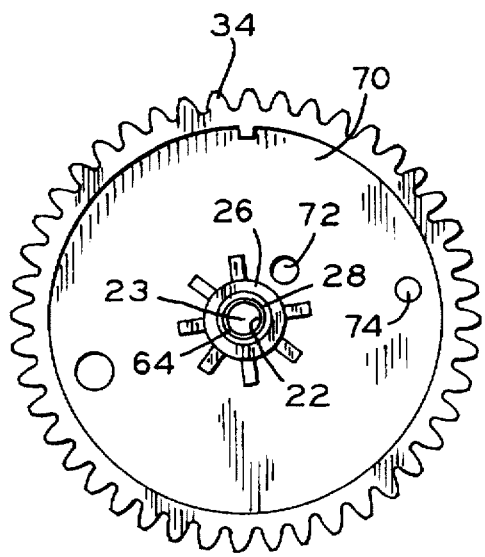
FIG_14

METHOD OF MANUFACTURING A PLASTIC CAMSHAFT WITH A TUBULAR METAL INSERT

BACKGROUND OF THE INVENTION

1. Field of the Invention.

The present invention relates to camshaft assemblies for internal combustion engines and more particularly to a method of manufacturing molded plastic camshafts having a metal insert for use in internal combustion engines.

2. Description of the Related Art.

It is known to use plastic camshafts in internal combustion engines. Plastic camshafts are known to run quieter and be easier to manufacture than metal camshafts. Although some plastics have sufficient strength to form an all plastic camshaft, sometimes a metal shaft in the form of a hollow tube or solid cylinder will be used in combination with a plastic material to form a composite camshaft.

Camshafts having a metal insert forming the core of the camshaft, however, require a precision ground metal shaft which satisfies tight tolerance requirements. The tight tolerances are required to locate the metal shafts properly within the die and to avoid the formation of flash in unwanted areas surrounding or within the metal shaft. If the metal shaft does not fit precisely in the mold, flash will form in the space between the two surfaces located at the ends of the metal shaft and the mold, and, for shafts formed of a hollow tube, in the interior space of tubular metal shaft. A shaft which does not fit precisely within the mold is also likely to be located improperly within the mold during the injection of plastic material. The precision grinding of the metal shaft to maintain the tight tolerances required to manufacture a composite shaft increases the cost of such composite camshafts.

It is desired to produce a composite camshaft according to a method which overcomes the disadvantages of the prior art.

SUMMARY OF THE INVENTION

The present invention provides a method for manufacturing a composite camshaft which permits the use of metal tubular shafts having increased tolerances while still properly locating the metal insert within the die and without producing unwanted flash.

The invention comprises, in one form thereof, a method of manufacturing a composite camshaft which includes the provision of a mold which includes two axially aligned tapered pins extending into the mold cavity. The tubular metal insert is placed on one of the pins and the second pin is inserted into the opposite end of the tubular metal insert. The two pins center the tube within the mold and slightly deform the tube ends by flaring them radially outward. The pins thereby form a tight seal with the tube and prevent flash from entering the tube. The tubular insert is shorter than the length of the camshaft and the tube ends do not form a portion of the annular surface at the ends of the camshaft. Thus, the tube ends are not required to precisely mate with the mold to prevent flash at the annular ends of the tube.

An advantage of the present invention is that greater tolerances for the length and diameter of the tubular metal insert are allowable thereby eliminating the need to precision grind the tubular metal insert.

Another advantage is the elimination of unwanted flash adjacent the ends and within the interior of the tubular metal insert.

Yet another advantage is that the plastic deformation of the tube ends can eliminate burrs formed on the tubing during cutting operations.

Still another advantage is the increased production capacity and reduced costs attained by reducing the steps required to manufacture a composite camshaft.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a partial cross-sectional view of a composite camshaft manufactured in accordance with the present invention.

FIG. 2 is a schematic view of an open die assembly for manufacturing a composite camshaft.

FIG. 3 is a schematic view of the die assembly with a metal tube placed on the lower tapered pin.

FIG. 4 is a schematic view of the die assembly after it has been closed.

FIG. 5 is a schematic view of the die assembly after plastic has been injected.

FIG. 6 is a schematic view of the die assembly as the camshaft is being ejected.

FIG. 11 is a cross-sectional view of the camshaft taken through the intake cam.

FIG. 12 is a cross-sectional view of the camshaft taken through the shaft.

FIG. 13 is an end view of the camshaft taken at the exhaust cam end.

FIG. 14 is an end view of the camshaft taken at the cam gear end.

Figure 7:
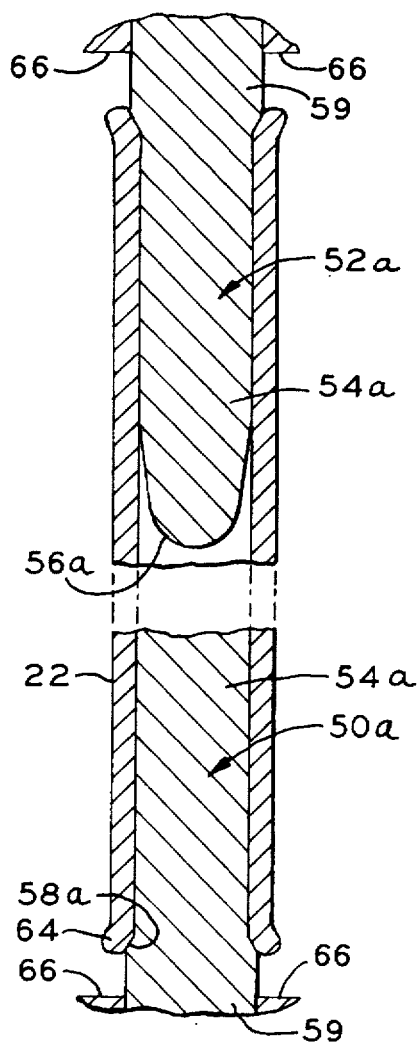
FIG. 7 is a partial cross-sectional view of the tapered pins and metal tube after the die assembly has been closed.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and the exemplification is not to be construed as limiting the scope of the invention in any manner.

DESCRIPTION OF THE PRESENT INVENTION

The embodiment disclosed below is not intended to be exhaustive or limit the invention to the precise form disclosed in the following detailed description.

As shown in FIG. 1, a composite camshaft 20 is formed of a tubular metal insert 22 and an outer plastic portion 24. The annular surfaces 26 located at the two ends of the camshaft 20 are formed entirely of the outer plastic portion 24. The outer plastic portion 24 has a slanted surface 28 which is disposed between the annular surfaces 26 and the interior surface of the flared ends 64 of tubular metal insert 22. The annular surface at the terminal ends of the tubular insert 22 are not exposed and are enclosed within the outer plastic portion 24. Also shown in FIG. 1 is the exhaust cam lobe 30, intake cam lobe 32, cam gear 34 and the bearing sleeve 36 which surrounds the exterior surface of the tubular metal insert 22, all of which comprise portions of the outer plastic portion 24.

Figures 3, 4:
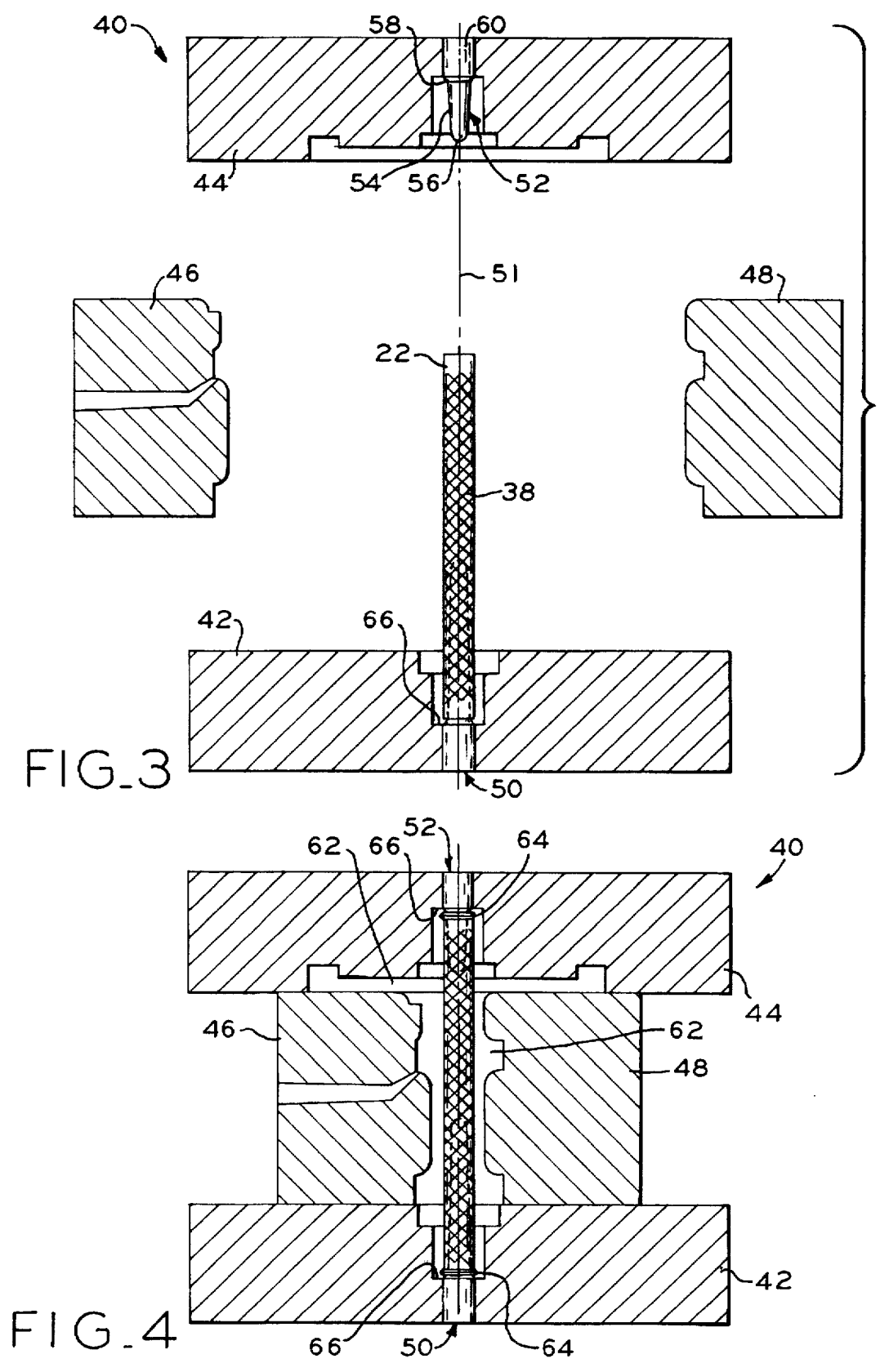

The tubular metal insert 22 is made from common commercial welded seam DOM (i.e., drawn over mandrel) low carbon steel tubing. The tubing may be cut to length with the relatively large tolerance of ±0.010 inch using, for example, an automated cut-off machine or screw machine. The outside surface of the tubing is textured to provide enhanced adhesion between the plastic and metal and thereby inhibit separation of the materials and improve the ability of the camshaft to transmit torque from the cam gear to the cam lobes. As seen in FIG. 3, the tubular metal insert 22 is knurled in a diamond pattern 38 to a depth of 0.010" to 0.020". The metal tubular insert 22 may be further treated with a phosphate wash before molding to improve the adhesion between the insert and surrounding plastic material and a rust preventative after molding. The tubular nature of the insert 22 also permits the use of its interior space as a passageway for lubricating oil in some engine designs.

The molding process used to form camshaft 20 is illustrated in FIGS. 2–6. FIG. 2 schematically illustrates, in an open position, a die assembly 40 which includes a first cavity block 42, a second cavity block 44, a third cavity block 46 and a fourth cavity block 48. The first cavity block 42 includes a first tapered pin 50 and second cavity block 44 includes a second tapered pin 52.

The first and second tapered pins 50 and 52 have a first tapered portion 54 which has a slight taper and terminates in a rounded end 56 and a second tapered portion 58 or shoulder which forms a larger angle with the axis of the tapered pin than the first tapered portion 54. The second tapered portion 58 is disposed between the first tapered portion 54 and a shank portion 60 which is secured to one of the cavity blocks. The pins 50, 52 may be formed of hardened tool steel commonly used in die construction.

A metal tubular insert 22 is placed on the first tapered pin 50 as shown in FIG. 3 while the die assembly 40 is still in the open position. The first tapered pin 50, which is relatively longer than the second tapered pin 52, aligns the tubular insert 22 with the second tapered pin 52 and properly positions the tubular insert 22 with respect to the cavity blocks 42, 44, 46 and 48. By placing first tapered pin 50 in a vertical position pointing upward, gravitational forces help to align and center the tubular insert 22 on first tapered pin 52. The tubular insert 22 may be placed upon first tapered pin 52 either manually or robotically.

The die assembly 40 is then moved into the closed position shown in FIG. 4. A mold cavity 5 having the shape of camshaft 20 is formed by the mold cavity blocks 42, 44, 46 and 48 when in the closed position. As the die assembly is closed, the second tapered pin 52 enters the end of the tubular insert 22 which is opposite the first tapered pin 50. The diameter of the second tapered portions 58 of the first and second tapered pins 50 and 52 is larger than the interior diameter of the tubular insert 22. The rounded ends 56 (and 56a in FIG. 7) have a diameter which is smaller than the interior diameter of the tubular insert 22 and facilitate the introduction of the tapered pins into interior space of the tubular insert 22. As shown in FIG. 7, the upper portions 54a are cylindrically shaped and it is not essential that the upper portions 54a of the pins have a taper.

As the mold is closed and the tapered pins are brought into the position shown in FIG. 4, the tubular insert 22 is axially compressed and the tube ends 64 are plastically deformed. The plastic deformation of the tube ends 64 slightly flares the ends as they conform to the shoulder or second tapered portions 58 of the pins 50 and 52 and, more significantly, creates a tight seal between the pins 50 and 52 and the tubular insert 22 to prevent the formation of flash in the interior of the tubular insert 22. The plastic deformation, or flaring, of the tube ends 64 also "coins" smooth burrs which may result from cutting the tubing to length and still be present on the tubular insert 22. The burrs are compressed and are typically pushed outward into the mold cavity and embedded within the plastic portion 24 of the cam shaft.

FIG. 7 schematically illustrates the deformation or flaring of tubular insert 22 as it is axially compressed by the tapered pins 50a and 52a. For the pins 50a and 52a shown in FIG. 7, the second tapered portion 58a is smaller than that shown in FIGS. 2–6 and the tubular metal insert 22 covers the entirety of second tapered portions 58a. A cylindrical portion 59 of the pins, however, spaces the second tapered portions 58a from mold surfaces 66 so that the ends of tubular insert 22 do not contact mold surfaces 66. Thus, a camshaft 20 manufactured using pins 50a, 52a would have a cylindrical interior plastic surface disposed between the annular surface 26 and the inner surface of the tubular insert 22 instead of a slanted interior plastic surface.

The ends 64 of the tubular insert 22 are spaced from the mold surface 66 which defines the annular surface 26 of the camshaft 20. Abutting the interior circumference of the annular mold surfaces 66 is the second tapered portion 58 of the first and second tapered pins 50 and 52. The second tapered portion 58 takes the shape of a right circular conical frustum and defines the slanted surface 28 of the camshaft 20. Because the ends 64 of the tubular insert are sealed against the pins 50 and 52 and are not required to precisely mate with the mold surface 66 to prevent unwanted flash from forming in the interior of the metal insert, tight tolerances do not have to be met when cutting tubular insert 22 and the step of precision grinding tubular insert 22 is eliminated. Pins 50 and 52 also hold metal insert 22 in the proper position within the mold cavity 62.

When the exterior surface of the second tapered portion is disposed at 60° to the common axis 51 of the pins 50 and 52 it has been found that an insert of common commercial welded seam DOM low carbon steel tubing will yield before splitting when compressed between the pins. It has also been found that the forces required to "crush" the insert are small in comparison to the magnitude of the mold closure forces. For example, one embodiment of a common commercial welded seam DOM low carbon steel tubing was found to begin to yielding at 0.010" of compression and continue to yield up to 0.060" without splitting the insert. Moreover, the force required to produce between 0.01" and 0.03" of compression ranged from approximately 482 lbs. to 890 lbs. These forces are well below the mold closure force which is measured in the tons and are, thus, of little consequence in the operation of the die assembly.

The injection of plastic material into mold cavity 62 is illustrated in FIG. 5. The plastic used to form the outer plastic region 24 is a reinforced thermoplastic nylon, for example, nylon 6/6, 17% glass filled. Thermoplastic nylon may be injection molded at high rates in multiple cavity molds thereby resulting in an efficient manufacturing process. It is also possible, however, to use other plastic materials. Molten plastic is injected into the mold cavity 62 through injection passage 68. The plastic material then cools to form outer plastic portion 24 of the camshaft 20.

The compliant characteristics of a thermoplastic nylon permits the camshaft 20 to dampen vibrations in camshaft 20 more readily than a metallic material and enables composite camshaft 20 to operate more quietly than an entirely metallic camshaft. Composite camshaft 20 is also lighter than an entirely metallic camshaft. The use of a metal insert with the thermoplastic nylon material permits unneeded material at the center of the shaft to be eliminated and thereby overcome problems with shrinkage and warping which can result when producing an entirely plastic camshaft. The metal insert additionally provides for increased stiffness and axial and radial stability.

Figure 8:
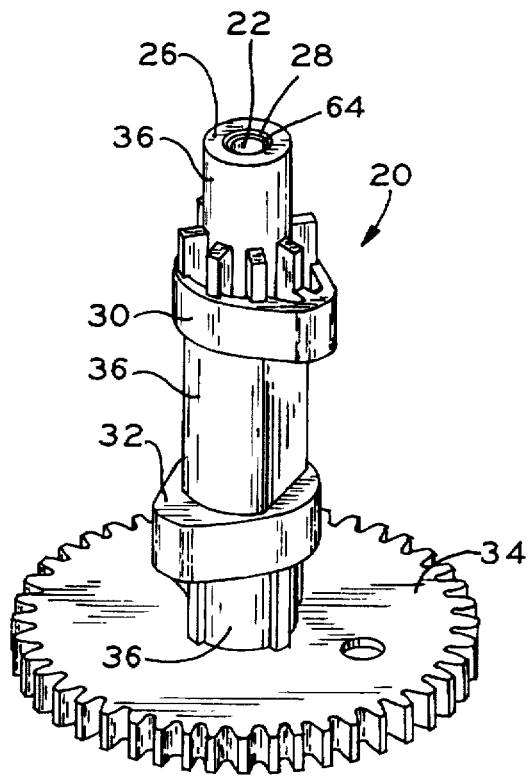
FIG. 8 is a perspective view of the camshaft.
Figure 9:
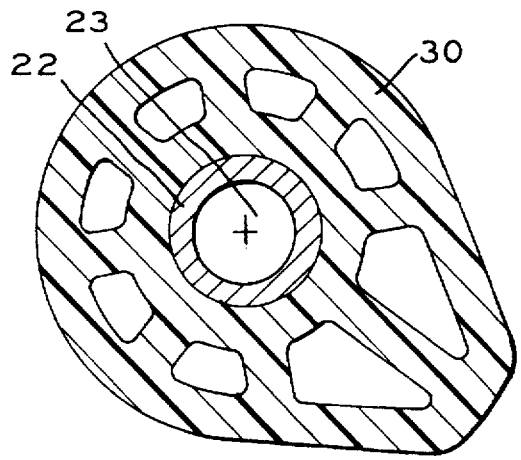
FIG. 9 is a cross-sectional view of the camshaft taken through the exhaust cam.
Figure 10:
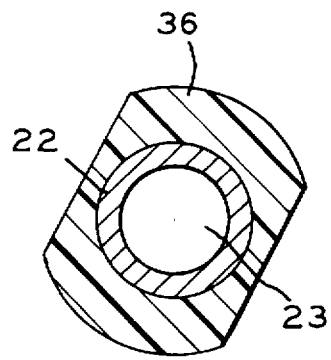
FIG. 10 is a cross-sectional view of the camshaft taken through the shaft.

FIGS. 8–14 show the outer plastic portion 24 in greater detail. FIG. 8 shows composite camshaft 20 in a perspective view. A cross-section of the exhaust cam lobe 30 which illustrates the metal insert 22 and the hollow interior 23 of the insert is shown in FIG. 9. The sleeve 36 of camshaft 20 is illustrated in FIG. 10 while the intake cam lobe 32 is shown in FIG. 11. FIG. 12 shows that portion of the camshaft 20 which is located between the intake cam lobe 32 and the cam gear 34 while FIGS. 13 and 14 are end views of the camshaft 20. As can be seen in FIGS. 1 and 14, the cam gear 34 has a recessed area 70 and a passage 72 therethrough. A mechanical compression release, not shown, may have a yoke positioned in the recessed area. An extension about which the yoke rotates is inserted into passage 72. A spring having one end attached to the yoke and a second end extending through a second passage 74 in the cam gear 34 also forms a part of the mechanical compression release. The mechanical compression release is used to maintain an intake or exhaust valve in a partially open position when the engine is being started.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing a plastic camshaft having a tubular metal insert, said method comprising:
providing a die assembly, said die assembly comprising a plurality of mold blocks, said mold blocks being movable between an open and a closed position, said mold blocks defining a mold cavity when in said closed position, said die assembly including first and second pins extending into said mold cavity when said mold blocks are in said closed position and first and second mold surfaces disposed on said mold blocks adjacent said pins are separated by a first length when said mold blocks are closed;
cutting the metal tubular insert to a second length shorter than said first length;
placing one end of the tubular metal insert on said first pin;
inserting said second pin in an opposite end of the tubular metal insert;
closing said mold blocks; and
filling said closed mold cavity with a molten plastic.

2. The method of claim 1 wherein each of said pins have an axis which is aligned with a common axial line and at least one of said pins is moved along said axial line when said mold blocks are moved between said open and closed positions whereby said pins align an axis of the tubular metal insert with said common axial line during insertion of said second pin into said tubular metal insert.

3. The method of claim 1 wherein said second pin is inserted simultaneously with said closing of said mold blocks.

4. The method of claim 1 wherein said second length is cut with a tolerance which is at least approximately plus or minus 0.010 inch.

5. The method of claim 1 wherein said tubular metal insert is placed on said first pin after being cut to said second length and without precision grinding of said tubular metal insert.

6. The method of claim 1 wherein said pins are tapered and said pins exert an axially compressive force on the tubular metal insert when said mold blocks are closed.

7. The method of claim 6 wherein said pins deform the ends of the tubular metal insert whereby a tight seal is formed between the tubular metal insert ends and said pins when said mold blocks are closed.

8. The method of claim 6 wherein each of said pins comprises an engagement surface disposed between a free end and a base portion, said engagement surfaces exerting the axially compressive force and each engagement surface defining a frustum, said free ends being insertable into the tubular metal insert and said base portions being attachable to one of said mold blocks whereby said axial compression of the tubular metal insert flares the ends of the tubular metal insert.

9. The method of claim 1 wherein each of said pins has a tapered free end.

10. The method of claim 1 further comprising the step of providing an exterior surface of the tubular metal insert with a diamond knurling pattern.

11. The method of claim 1 wherein said filling of said mold cavity comprises the injection of a molten glass reinforced nylon material.

12. A method of manufacturing a plastic camshaft having a tubular metal insert, said method comprising:
cutting the tubular metal insert to a first length;
providing a die assembly, said die assembly comprising a plurality of mold blocks, said mold blocks being movable between an open and closed position, said mold blocks defining a mold cavity when in said closed position, said die assembly including first and second pins each having a respective base portion attached to one of said mold blocks, said pins being aligned along a common axis, said pins extending into said mold cavity when said mold blocks are in said closed position, each of said pins having a tapered section on said extending portion of said pins;
placing one end of the tubular metal insert on said first pin when said mold blocks are in said open position;
inserting said second pin in an opposite end of the tubular metal insert by moving said second pin along said common axis towards said first pin thereby aligning said tubular metal insert with said common axis;
axially compressing the tubular metal insert with said tapered sections of said first and second pins whereby the tubular metal insert ends are flared;
closing said mold blocks whereby the tubular metal insert and ends thereof are disposed within said mold cavity; and
injecting a molten plastic into said closed mold cavity.

13. The method of claim 12 wherein first and second mold surfaces disposed on said blocks adjacent said pins are separated by a second length when said mold blocks are closed and said first length is shorter than said second length.

14. The method of claim 13 wherein said first length is cut with a tolerance which is at least approximately plus or minus 0.010 inch.

15. The method of claim 12 wherein each of said tapered sections comprises an engagement surface disposed between a free end and said base portion, said engagement surface exerting forces for the axial compression of the tubular metal insert and defining a frustum, said free ends being insertable into the tubular metal insert.

16. The method of claim 12 wherein said second pin is inserted simultaneously with said closing of said mold blocks.

* * * * *